(12) United States Patent
Isaac

(10) Patent No.: US 9,120,536 B2
(45) Date of Patent: Sep. 1, 2015

(54) APPARATUS FOR MOUNTING ACCESSORIES TO A PERSONAL WATERCRAFT

(71) Applicant: Troy Isaac, Sault Ste. Marie (CA)

(72) Inventor: Troy Isaac, Sault Ste. Marie (CA)

(73) Assignee: Troy Isaac

( * ) Notice: Subject to any disclaimer, the term of this patent is extended or adjusted under 35 U.S.C. 154(b) by 12 days.

(21) Appl. No.: 14/098,745

(22) Filed: Dec. 6, 2013

(65) Prior Publication Data

US 2014/0144365 A1 May 29, 2014

Related U.S. Application Data

(63) Continuation-in-part of application No. 13/685,921, filed on Nov. 27, 2012, now Pat. No. 8,833,289.

(60) Provisional application No. 61/564,419, filed on Nov. 29, 2011.

(51) Int. Cl.
*B63B 17/00* (2006.01)
*A01K 97/10* (2006.01)
*F16M 13/02* (2006.01)
*B63B 25/00* (2006.01)

(52) U.S. Cl.
CPC ............. *B63B 17/00* (2013.01); *A01K 97/10* (2013.01); *B63B 25/00* (2013.01); *F16M 13/022* (2013.01)

(58) Field of Classification Search
CPC ...... B63B 25/00; B63B 17/00; B63B 35/815; B63B 35/816; A01K 97/10; F16M 13/022
USPC .............. 114/343, 364; 248/230.5, 230.6, 248/231.41, 311.2
See application file for complete search history.

(56) References Cited

U.S. PATENT DOCUMENTS

| 4,947,777 A * | 8/1990 | Yoder .......................... 114/364 |
| 7,992,512 B2 * | 8/2011 | Rodriguez et al. ............ 114/364 |
| 8,833,289 B2 * | 9/2014 | Isaac ............................ 114/343 |

\* cited by examiner

*Primary Examiner* — Lars A Olson

(57) ABSTRACT

An apparatus for mounting an accessory to a personal watercraft includes an accessory mounting assembly and a cooperating bracket.

18 Claims, 12 Drawing Sheets

APPARATUS FOR MOUNTING ACCESSORIES TO A PERSONAL WATERCRAFT

RELATED APPLICATIONS/PRIORITY BENEFIT CLAIM

This application is a continuation-in-part of U.S. patent application Ser. No. 13/685,921 filed Nov. 27, 2012 which claims the benefit of U.S. Provisional Application No. 61/564,419, filed Nov. 29, 2011, the entirety of which provisional application is hereby incorporated by reference.

FIELD OF THE INVENTION

The present invention relates to personal watercraft, often abbreviated "PWC". In particular, the invention is directed to a fishing/hunting/recreational mounting bracket for a PWC that extends the usefulness and safety of the PWC.

BACKGROUND

Personal watercraft (PWCs) generally do not provide devices for mounting items such as rod holders, sonar, lights, cooler accessories, beverage containers/holders, fuel containers, wiring, gun cases, camping supplies, and fishing and hunting accessories, requiring that they be held by the user. At best, PWCs tend to have a limited amount of storage space and no means of mounting items of interest or sporting accessories.

Personal watercraft have advanced in size, power and maneuverability; however, their storage and useful functionality have not kept pace with the needs of users. The introduction of the present invention to extend the usefulness of said watercraft is important and highly useful to this sporting category of watercraft. The present invention is simple and is an economical solution to a storage problem that has been associated with PWCs since their inception.

PWCs are often more affordable than boats, and in many cases, the PWC is both more powerful and maneuverable than conventional boats, making them increasingly popular. As they have evolved with this popularity, their deck size has increased, accommodating as many as three people onboard. However, storage space and equipment-mounting options have not kept pace, and due to the lack of storage space and/or mounting locations, users have to hold onto their equipment manually, both while the PWC is underway and also while on location. This situation is both distracting and inconvenient. Further, items not securely attached to the watercraft while in operation are easily lost and/or damaged.

While some previous attempts have been made to improve the storage and equipment-mounting capabilities of PWCs, they have not solved the foregoing problems. Known methods for storing gear on PWCs are bulky and expensive and often improvised, and tend to require that the PWC be modified, potentially causing structural weakness and fatigue points.

US patent application publication number US 2007/0000426 A1 discloses a racking system for strapping luggage onto the top surface of a PWC. The racking system is extended in front of the operator's seat, and requires the manufacturer's original design to be modified as does the aforementioned racking system. Moreover, racks forward of the operator's seat are difficult for passengers to access.

U.S. Pat. Nos. 4,738,216, 3,747,554, 3,257,971 and 4,993,343 are all designed and intended to be used as waterski tow hooks.

US patent application publication number US 2006/0011683 A1 discloses a racking system for strapping and holding luggage.

US patent application publication number US 2004/0025774 A1 deals with a waterskiing apparatus.

BRIEF SUMMARY

When combined with the increased on-deck area of modern PWCs, the present bracket invention enables usefulness beyond that for which the craft was originally designed. Fishermen and hunters, for example, will now find PWCs more useful for their gear-intensive activities.

One of the main benefits of the present invention is that it uses existing features already built into the watercraft for mounting purposes. More specifically, the present invention is a substantially rigid U-shaped frame bracket mounted over the rear deck of the PWC. The bracket utilizes existing holes in the PWC made to receive the manufacturer's waterskiing or tow hook, and may optionally also use the two PWC lifting points located on the transom of the watercraft. The present invention accordingly does not introduce any additional holes into the body of the watercraft for the bracket to be installed, nor does it add structural fatigue to the PWC.

The bracket of the present invention provides multiple mounting points on the watercraft for mooring the PWC, and providing handholds when boarding the PWC at the rear deck, whether from a dock or from the water. The bracket also gives users the ability to secure/mount items to the watercraft, leaving their hands free to control the watercraft while in operation. This significantly increases the security of everyone on the water.

The bracket of the present invention has a continuous "wire" frame structure defining multiple possible mounting points over its perimeter, and defining an interior storage area within the perimeter of the frame. Although the exact shape of the bracket can vary, it can be considered generally "U-shaped" in that it has two free ends with an otherwise continuous frame between the ends defining an inner storage area. The bracket may be formed from rigid, or substantially rigid (but somewhat flexible), rods such as steel, plastic, hollow tube or a threaded metal rod with a plastic covering/coating or other appropriate material. The bracket may be shaped in a manner that allows accessories to be mounted onto it and ultimately the watercraft itself. The bracket may be shaped in a fashion that allows the bracket to be mounted on the watercraft utilizing a preexisting location or mounting points.

The bracket may utilize the two apertures formed in the watercraft for the original equipment that allows a user to tow water skiers or tube riders from the rear of the PWC. The opposing ends of the bracket may be inserted through these existing open apertures left by removing the manufacturer's waterskiing hook, and the bracket may be secured by the required number of nuts and/or securing devices directly onto the PWC.

The bracket of the present invention allows a device for electrical power and control wiring to be securely mounted/attached to the PWC.

The bracket of the present invention allows the PWC to be quickly secured to a dock by using the bracket as a securing location at the rear of the PWC, with raised locating points above the hull at seat level where they can be easily accessed by users disabled from full mobility. Prior securing points on PWCs are under the hull low to the water and are very difficult to reach.

The bracket of the present invention allows for the attaching and deployment of known speed regulating apparatus, much like a pail or water parachute that creates drag, being launched from the back of the PWC. The speed regulator may be attached to the two lifting hooks located on the rear transom and to the bracket of the present invention, enabling the speed regulating apparatus to be easily stored, deployed, and retrieved.

The location of the bracket of the present invention does not inhibit access to any storage compartments or apparatus located on the PWC, making it a structurally fixed and static part of the PWC.

The bracket of the present invention provides an apparatus for securing such items as hunting and fishing equipment, camping supplies, water skis, wake boards, inner tubes and diving equipment to the rear of the operator. Locating such equipment weight to the front of the PWC could detrimentally affect the handling of the PWC. Securing this equipment to the main rear deck of the PWC using the bracket of the present invention allocates weight where the PWC was designed to carry the extra weight of passengers-on and over the PWC rear deck area, between the seat and the transom, thusly maintaining the original operational characteristics of the PWC.

The bracket of the present invention allows a lighting system to be mounted onto the bracket, providing a feature that is not presently available on known PWCs at this time. This bracket of the present invention thus aids increased visibility while operating on the water, both for the PWC operator and for others both on and off the PWC.

Storing any foreign (i.e., non-PWC native) materials or articles in front of the operator on a PWC can potentially distract the operator which is a significant concern at operating speeds which may approach 60 mph in possibly rough water. Using the rear-mounted bracket of the present invention, foreign articles may be located behind the operator and passengers thereby eliminating any possibility of causing distraction while the PWC is in motion.

The bracket of the present invention is intended to function in combination with the PWC as a system, acting between the PWC and any accessory that needs attaching, seamlessly integrating to the existing design of the PWC without having to modify the PWC. The bracket of the present invention gives the PWC the functionality of a fishing or hunting boat at the price of a PWC.

It is the object of the present bracket invention to provide a PWC user with an, easy to install, economical, highly utilitarian apparatus that can be used for multipurpose applications.

The bracket of the present invention may further include an optional single strap or straps arranged for fastening the bracket to a portion of the watercraft, most notably to the lifting hooks located on the watercraft's lower transom. These lifting hooks may be used to secure an end of the strap, therein adding strength and stability to the bracket.

The bracket comprises two free ends and a continuous "wire" frame enclosing an interior storage area and supported above the rear deck. In a first form, the bracket has a longitudinal frame portion or "stem" with two spaced, generally parallel legs extending generally parallel to the PWC centerline (bow to stern axis), the longitudinal frame portion supported in cantilever fashion above the rear deck by two ends mounted in the water ski hook-mounting holes normally formed in the rear of the PWC seat. In a further form, the bracket includes an enlarged "head" or "hammerhead" frame portion contiguous with and extending laterally (port-to-stern or beam axis of the PWC) from the stem portion.

In one form the bracket may have a substantially rectangular configuration with an inverted longitudinal stem portion extending into, and substantially surrounded by the enlarged rectangular head portion, the bracket supported horizontally above the rear deck on legs that sit on the rear deck of the watercraft. The inverted stem may further include free ends of the bracket angled to sit or be mounted to the deck, for example in apertures in the deck similar to apertures 5 in the rear 6 of the seat 2. Straps can be used to further secure the bracket to the PWC.

By "wire" or "rod" I intend to include any elongated rod, tube or wire structure (or equivalent) that is rigid enough to hold its shape when mounted above the deck of the PWC, and rigid enough to provide a secure mount for equipment secured by mechanical connection to the frame, and to provide a secure restraint for equipment placed within the interior storage area defined inside the perimeter of the frame.

The features of the invention can be understood and appreciated by referring to the accompanying drawings, which are not to any particular scale, and to the detailed description of the invention.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

FIGS. 1-11 represent example embodiments of the bracket invention in different designs in use with a generic, schematically illustrated PWC, in order to teach how to make and use the invention. These examples are representative of the invention without intended to be limiting as to the form of the bracket or the type of PWC on which it is mounted.

Figure 1A:
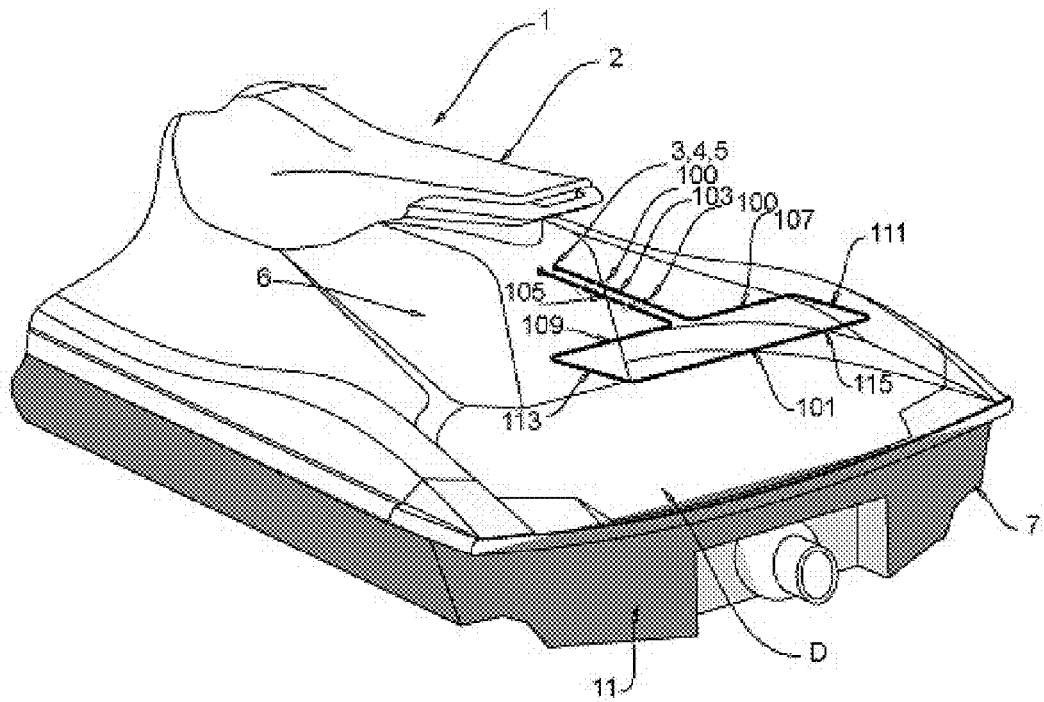
FIG. 1A illustrates a perspective view of the invention with a hammerhead type of end that allows a perpendicular area for mounting forward and rear facing accessories such as a sonar, as well as lateral mounting locations for rod holders and other accessories.
Figure 1B:
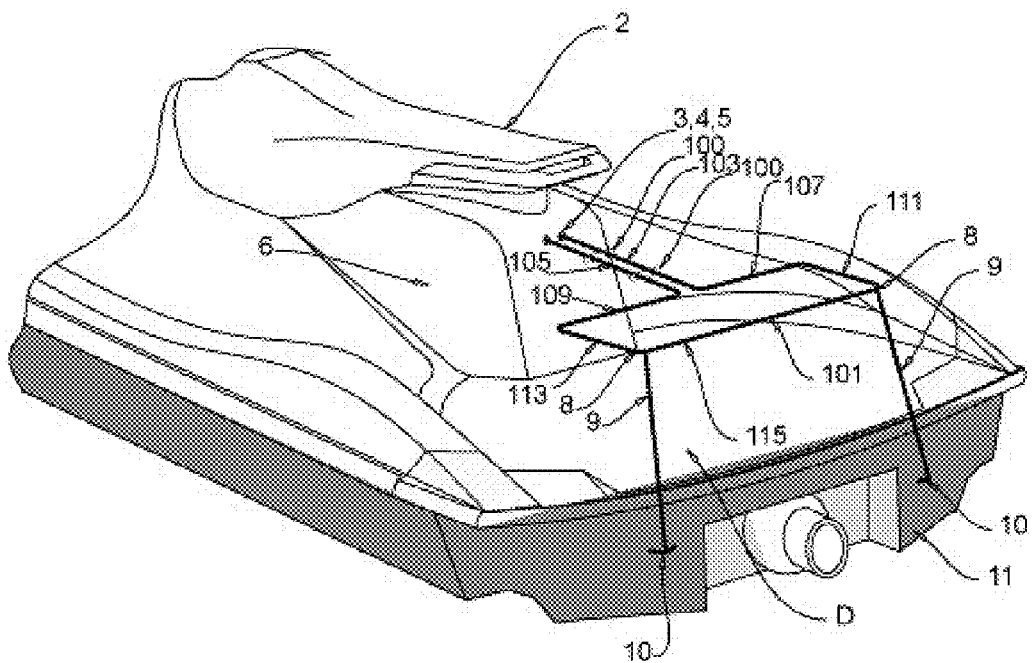
FIG. 1B illustrates the bracket of FIG. 1A utilizing two additional PWC location points on the transom with strapping.

FIGS. 1A and 1B show a "hammerhead" design having longitudinal and transverse frame portions, shown with (FIG. 1B) and without (FIG. 1A) additional strapping. FIGS. 1A and 1B additionally illustrate a seat 2 of the PWC 1; inner fasteners 3, outer fasteners 4, and a known type of water ski/tow hook mounting apertures 5 in the rear 6 of the PWC seat 2; the hull 7 of the PWC; one or more strap connecting positions 8 on the bracket; one or more straps 9; and known lifting hooks 10 in PWC transom 11. The PWC has a rear deck D where passengers normally ride or sit.

In FIGS. 1A and 1B, the bracket 101 is a continuous wire frame that may be formed by a rod, of hollow or solid cross-section, either a continuous rod or multiple rod sections assembled into a continuous frame. While a uniform, constant diameter/thickness is shown for the rod frame of bracket 101, the diameter or thickness could vary over the perimeter of the frame. Bracket 101 includes a first front longitudinal leg 103 and a second front longitudinal leg 105 (generally parallel to the longitudinal axis of the PWC). Longitudinal legs 103 and 105 are substantially parallel to one another and extend from the water ski mounting hook apertures 5. In the hammerhead version of FIGS. 1A and 1B, longitudinal legs 103 and 105 terminate at the bracket front end in free ends 103a and 105a (best shown in FIGS. 6 through 10, and common to all of the illustrated embodiments) secured in mounting apertures 5 in the rear seat 2 of the PWC, for example with inner and outer fasteners 3 and 4 in a manner similar to the original ski/tow hook structure, or with any other connecting structure or method including, but not limited to, structural adhesives. Longitudinal bracket legs 103 and 105 terminate at their rear ends where the frame extends laterally to form a substantially rectangular enlarged storage portion which includes a first front transverse section 107 (transverse to the longitudinal axis of the PWC) connected to the first front longitudinal leg 103, and a second front transverse section 109 connected to the second longitudinal leg 105. The first front transverse section 107 is connected to a first back longitudinal section 111, and the second front transverse section 109 is connected to a second back longitudinal section 113. The first back longitudinal section 111 and the second back longitudinal section 113 are connected to the back transverse section 115.

In FIG. 1B, the back transverse section 115 of bracket 101 is shown with optional straps 9 secured to the bracket at strap connection positions 8 (in the illustrated embodiment, the corners of the hammerhead area). The straps 9 are connected at their lower ends to the lifting hooks 10 which are commonly found attached to or adjacent the transom 11. Straps 9 may reduce the tendency of the cantilevered frame to vibrate or bounce in rough seas; as such they are not a support for the frame, but rather function as a tensioning device.

The bracket shown in FIGS. 1A and 1B is mounted in cantilever fashion to the rear of seat 2 of the PWC by the front ends of longitudinal legs 103 and 105, which form the free or terminal ends of the substantially rigid bracket frame. The remainder of the bracket 101, which is generally planar (in a single plane), is located above deck D, preferably parallel to the deck although different angular orientations are possible.

FIGS. 1A and 1B show clip-type spacers 100 connected between legs 103 and 105, for example made from wire ovals or molded plastic pieces with apertures for legs 103 and 105 to pass through. Clips 100 may be used to add rigidity to the stem portion of the frame defined by legs 103 and 105, or may be used to partition the storage area defined between legs 103 and 105 to better retain/secure items such as fishing rod handles and the like placed therein. Clips 100 are also shown in subsequent Figures.

Figure 2A:
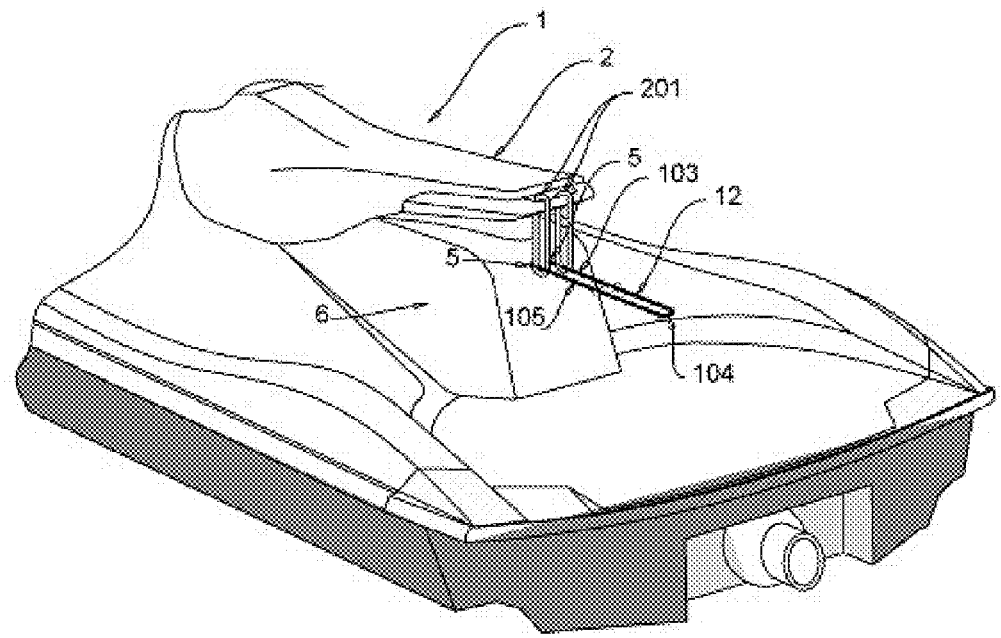
FIG. 2A illustrates a perspective view of an alternate form of the bracket invention, with two lateral areas for mounting accessories and an easy mooring bracket to tie off to the dock.

FIG. 2A illustrates a short, narrow bracket 12 that consists essentially of the longitudinal stem portion of the hammerhead design of FIGS. 1A and 1B, comprising legs 103 and 105 formed by a rod which forms a narrow, elongated U-shape. The longitudinal legs terminate at the rear end of the bracket in a rounded bight 104, rather than extending transversely into an enlarged hammerhead region. FIG. 2A also shows optional stabilizing straps 201 connected at one end to the inner end of the bracket 12 adjacent the rear 6 of seat 2, and connected at their other end to a rear portion of seat 2, for example a handle of known type, a hook or cleat, or some other convenient mounting point above the bracket at the rear of the seat. Straps 201 may be used to stabilize the bracket against swaying motion, and to prevent the bracket from bouncing in heavy waves. Straps 201 also help support the weight of any equipment mounted on bracket 12. Straps 201 may be made of any material, including but not limited to plastic tie wraps, nylon straps, and metal strapping, and may be flexible or more or less rigid. While two straps 201 are shown, with one strap connected to each leg of the bracket, a single strap 201 might be looped around or otherwise connected to the legs of the bracket. Straps 201 preferably run vertically from the inner end of the bracket 12 to an overlying connection point on the rear of the seat, so as not to interfere with access to equipment stored in or mounted on the bracket.

Figure 2B:
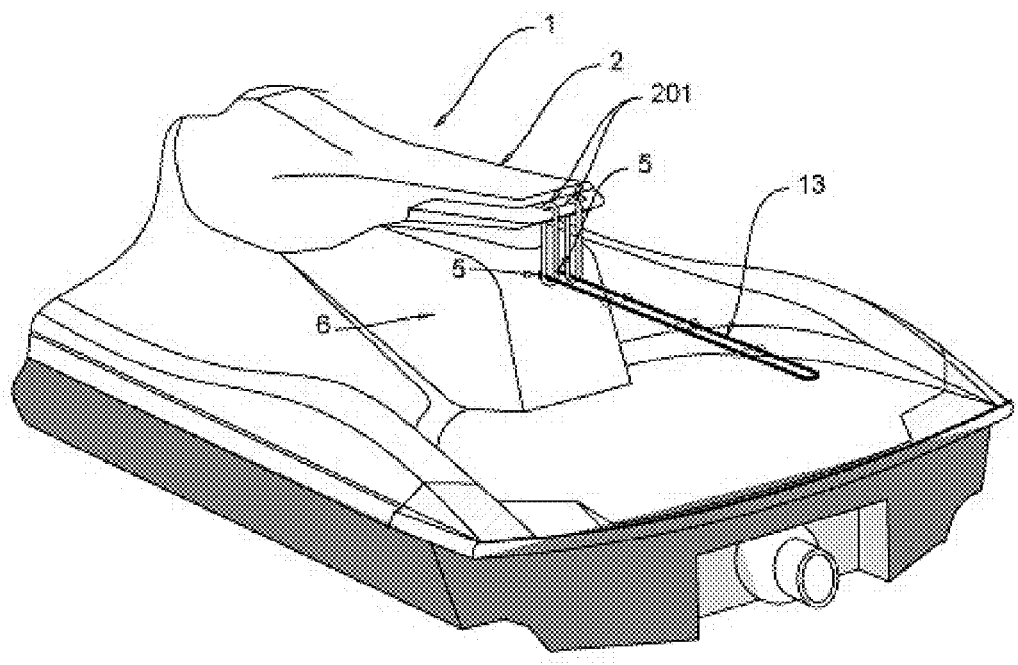
FIG. 2B illustrates a longer form of the bracket in FIG. 2A, with more mounting area.

FIG. 2B illustrates a double-length bracket 13 similar to bracket 12 in FIG. 2A, only longer. Straps 201 are also shown in use with the bracket of FIG. 2B, and it should be understood that straps 201 could be used with any of the brackets described herein.

Figure 3:
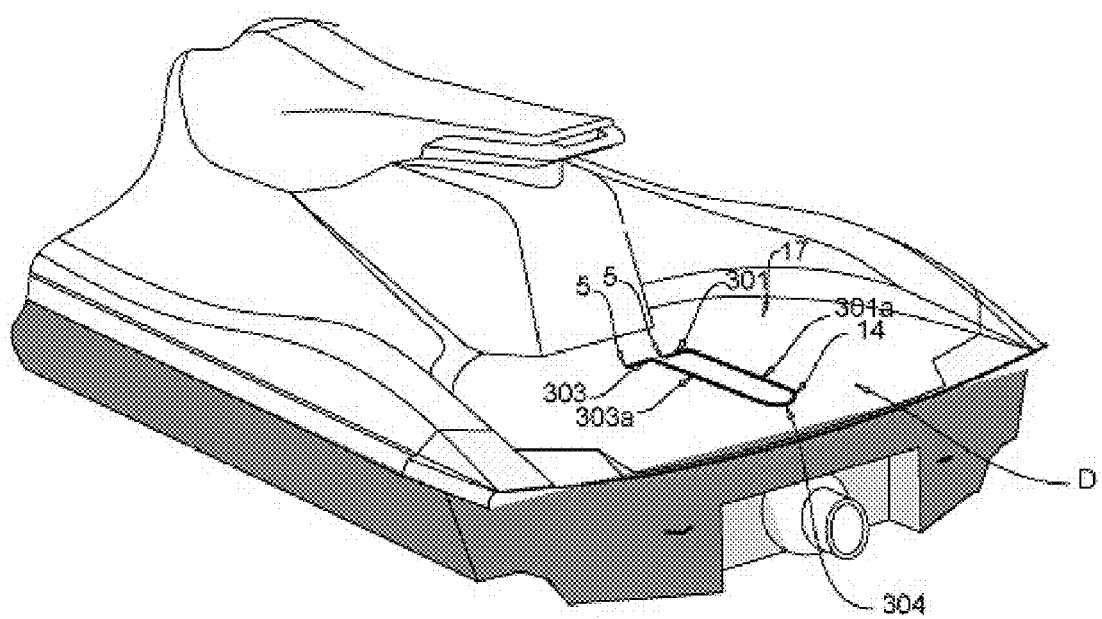
FIG. 3 is a perspective view of a multi-planar version of the longitudinal bracket of FIGS. 2A and 2B, whose shape is applicable both to rear seat mounting hole locations as well as deck mounting hole locations.

FIG. 3 illustrates a bracket 17 formed by a rod including a first front longitudinal inclined leg 301 and a second front longitudinal inclined leg 303 in a spaced relationship with the first longitudinal inclined leg 301. The front longitudinal inclined leg 301 and the front longitudinal inclined leg 303 are inclined relative to rear longitudinal leg portions 301a and 303a at an acute angle. Bracket 17 is accordingly a multi-planar version of brackets 12 and 13 in FIGS. 2A and 2B, with front leg portions 301 and 303 lying in a first plane, and rear leg portions 301a and 303a lying in a second plane set at an acute angle to the first plane. Either plane may be at an acute angle with respect to the deck of the PWC, depending whether the free ends of the front leg portions are mounted in the apertures 5 in the PWC rear seat as in FIGS. 1A through 2B, or in apertures 5 in deck D. In the illustrated example of FIG. 3, first longitudinal inclined leg 301 and the second longitudinal inclined leg 303 are acutely angled (e.g., 45° or so) relative to deck D, and connect to a U-shaped section 304 formed by rear leg portions 301a and 303a that is substantially parallel to the back deck D.

Figure 4A:
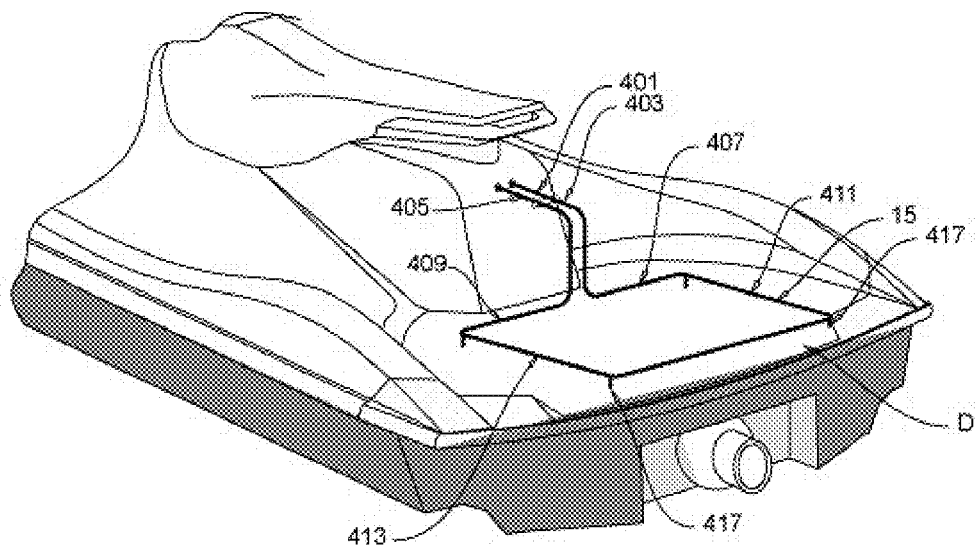
FIG. 4A illustrates a perspective view of a modified multi-planar version of the hammerhead type bracket in FIGS. 1A and 1B, with lateral and perpendicular mounting surfaces lowered to the rear deck level.

In FIG. 4A, an alternate bracket 401 comprises a rod structure including a first front longitudinal section 403 which may be substantially L-shaped and a second front longitudinal section 405 (parallel to the longitudinal axis of the PWC) which may be substantially L-shaped and which is substantially parallel to the first front longitudinal section 403 and the which extends from the aperture 5 and further extends to a substantially rectangular enlarged head portion in a different plane than the horizontal portions of legs 403 and 405. The enlarged head portion includes a first front transverse section 407 (transverse to the longitudinal axis of the PWC) connected to the first front longitudinal section 403 and a second front transverse section 409 connected to the second longitudinal section 405. The first front transverse section 407 is connected to a first back longitudinal section 411, and the second front transverse section 409 is connected to a second back longitudinal section 413. The first back longitudinal section 411 and the second back longitudinal section 413 are connected to the back transverse section 415. The substantially rectangular portion may optionally include one or more downward extending arms or leg 417 to connect or support the substantially rectangular portion to or on the deck D of the PWC. Depending on the weight and rigidity of the rod material used for the bracket, legs 417 may not be needed, and the enlarged head portion comprising sections 407-418 may be suspended above deck D by legs 403 and 405.

Figure 4B:
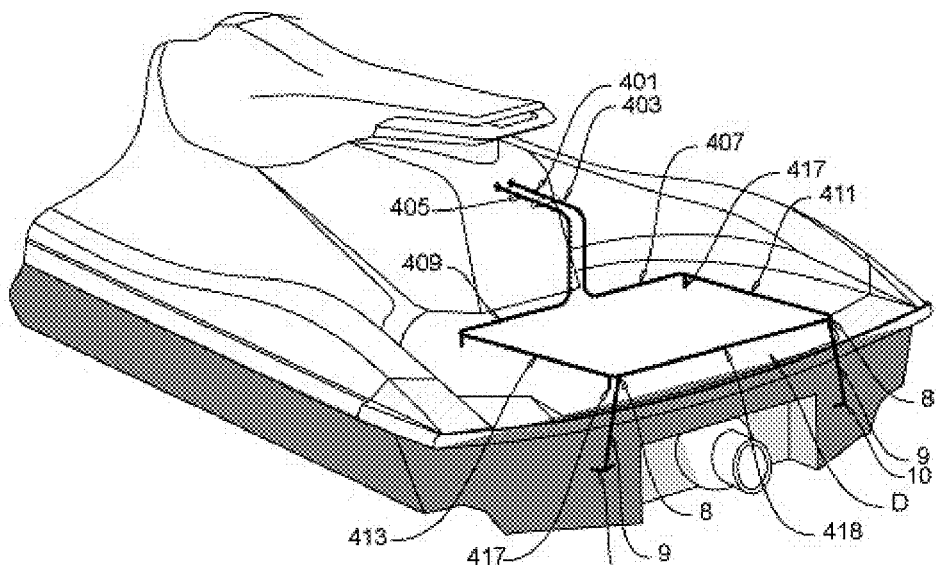
FIG. 4B illustrates the bracket of FIG. 4A utilizing two other location points on the transom with strapping.

In FIG. 4B, the back transverse section 418 of the bracket 401 is shown with optional straps 9 secured to the bracket at strap connection positions 8 (in the illustrated embodiment, the corners of the enlarged head area). The straps 9 are connected at their lower ends to the lifting hooks 10 which are commonly found attached to or adjacent the transom 11.

Figure 5A:
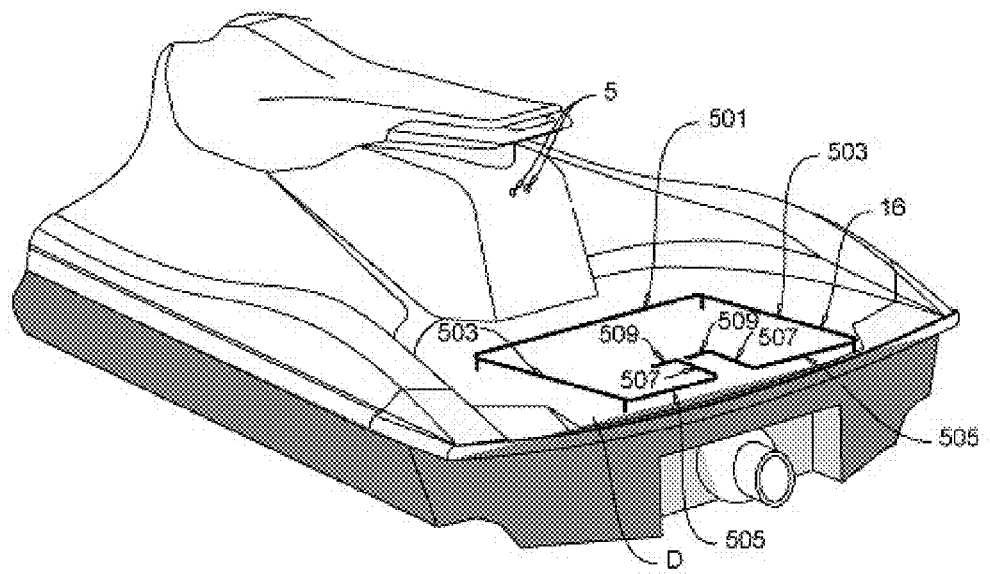
FIG. 5A illustrates a perspective view of a modified planar version of the hammerhead type bracket in FIGS. 1A and 1B lowered to the rear deck level, with an inverted longitudinal stem.

FIG. 5A illustrates a bracket 16 which may be a rod which may be in the shape of a discontinuous rectangle with an inverted longitudinal "stem" portion 507, 509, and which may include a front traverse section 501 which may be connected to an opposing pair of side longitudinal sections 503 which may be connected to an opposing pair of back traverse sections 505 which may be connected to a pair of opposing back longitudinal sections 507 which may be connected to a pair of opposing inclined longitudinal sections 509 which may form an acute angle with respect to the deck and which may be connected to the deck of the PWC. The bracket 16 may be mounted on downward extending arms 517 which may support the bracket 16 on the deck of the PWC.

Figure 5B:
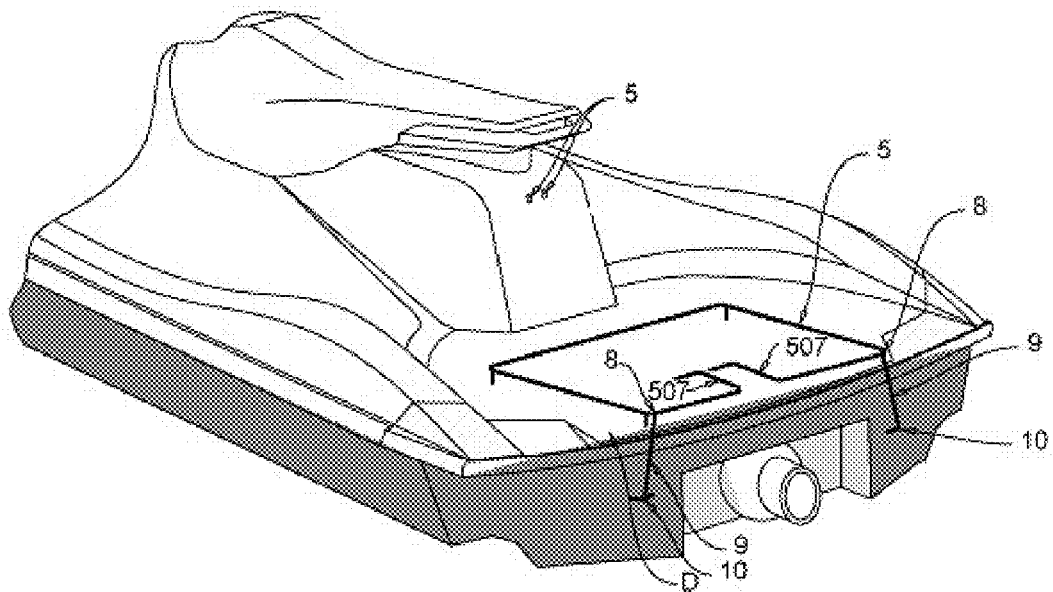
FIG. 5B illustrates the bracket of FIG. 5A utilizing two other location points on the transom with strapping.

FIG. 5B illustrates one or more optional straps 9 extending between a strap connecting point 8 to lifting hooks 10.

Figure 6:
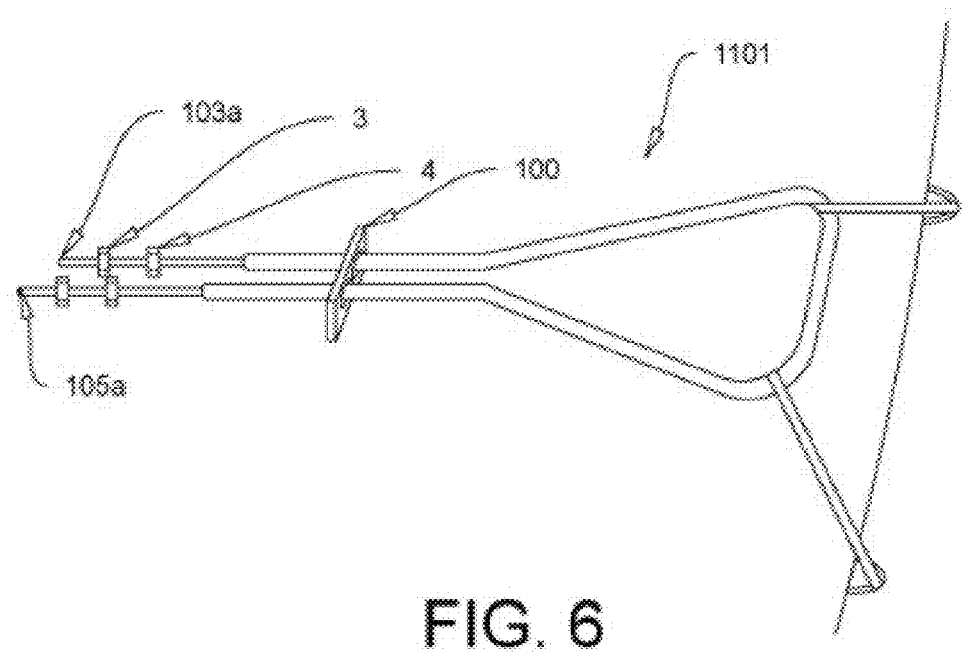
FIG. 6 illustrates a detailed perspective view of a bracket similar to the bracket of FIG. 1B, but with a modified triangular hammerhead.
Figure 7:
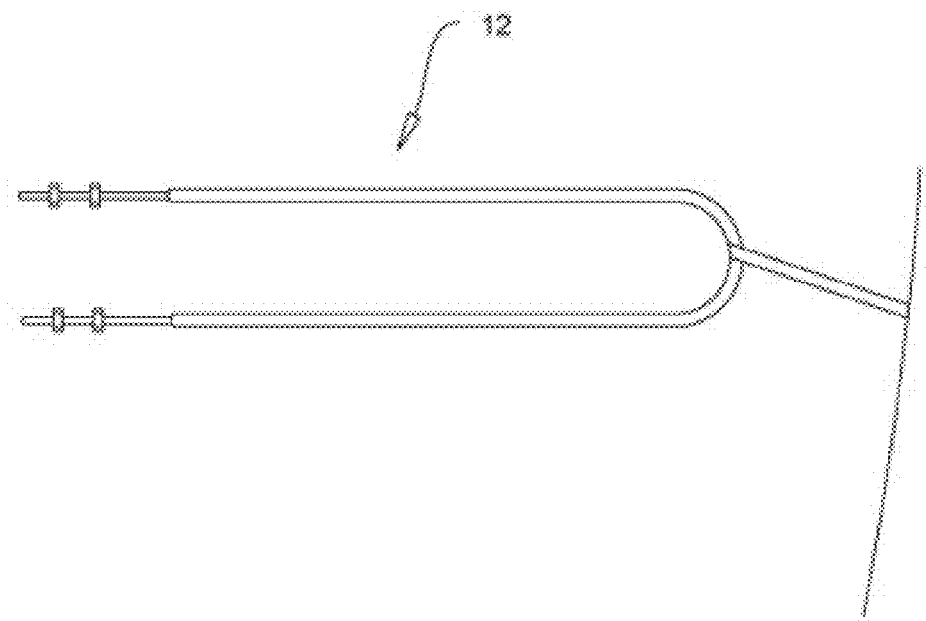
FIG. 7 illustrates a perspective view of the bracket of FIG. 2B.
Figure 8:
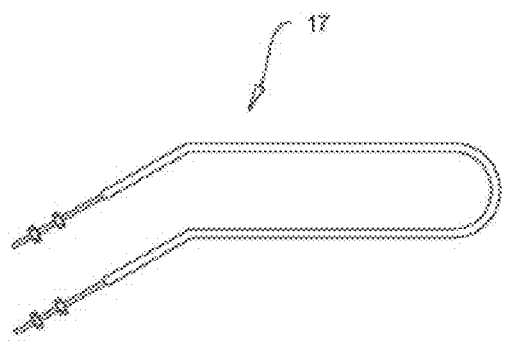
FIG. 8 illustrates a perspective view of bracket of FIG. 3.
Figures 9, 10:
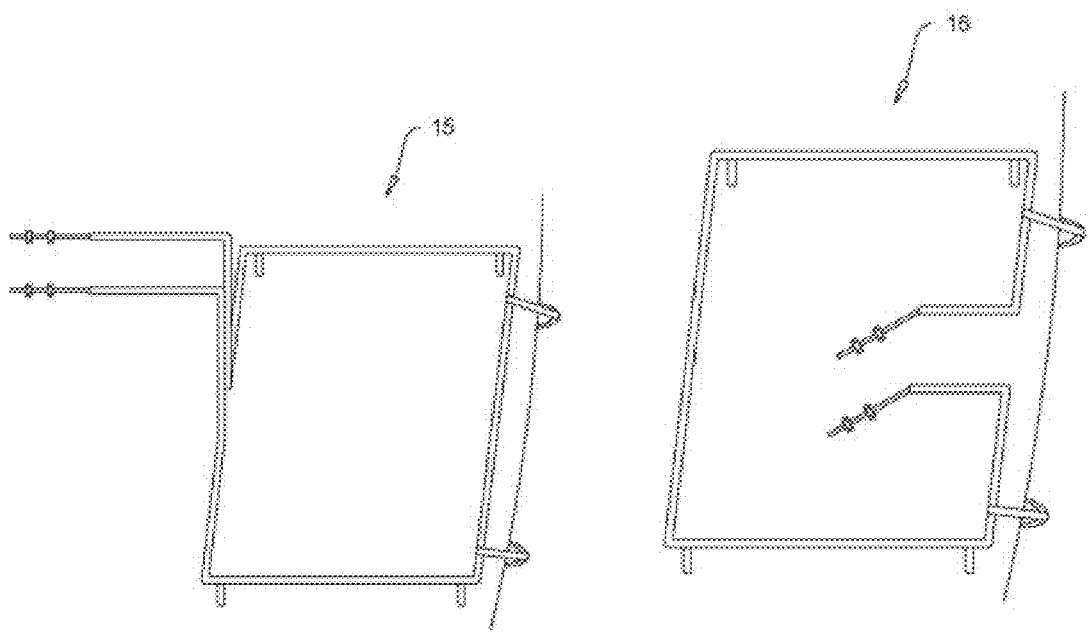
FIG. 9 illustrates a perspective view of the bracket of FIG. 4B.
FIG. 10 illustrates a detailed perspective view of the bracket of FIG. 5B.
Figure 11:
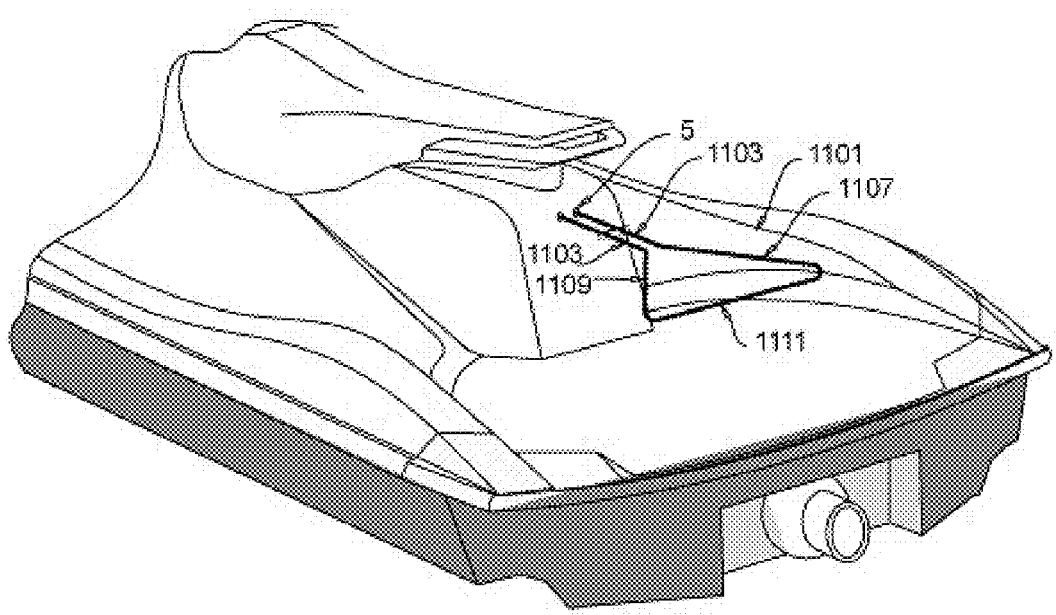
FIG. 11 illustrates the bracket of FIG. 6 mounted on a PWC.

FIG. 6 illustrates a perspective view of a bracket 1101 similar to bracket 101 in FIG. 1B, but with a modified triangular head portion in the shape of a discontinuous triangle and which includes a first front longitudinal section 1103 and a second front longitudinal section 1105 (parallel to the longitudinal axis of the PWC) substantially parallel to the first front longitudinal section 1103 and the which extends from the aperture and further extends to a substantially continuous triangular enlarged head portion including a first front angled section 1107 (angled at an acute angle to the longitudinal axis of the PWC) connected to the first front longitudinal section 1103 and a second front angled section 1109 (angled at an acute angle to the longitudinal axis of the PWC) connected to the second longitudinal section 1105. The first front angled section 1107 is connected to a back transverse section 1111, and the second front angled section 1109 is connected to the back transverse section 1111.

Figure 12:
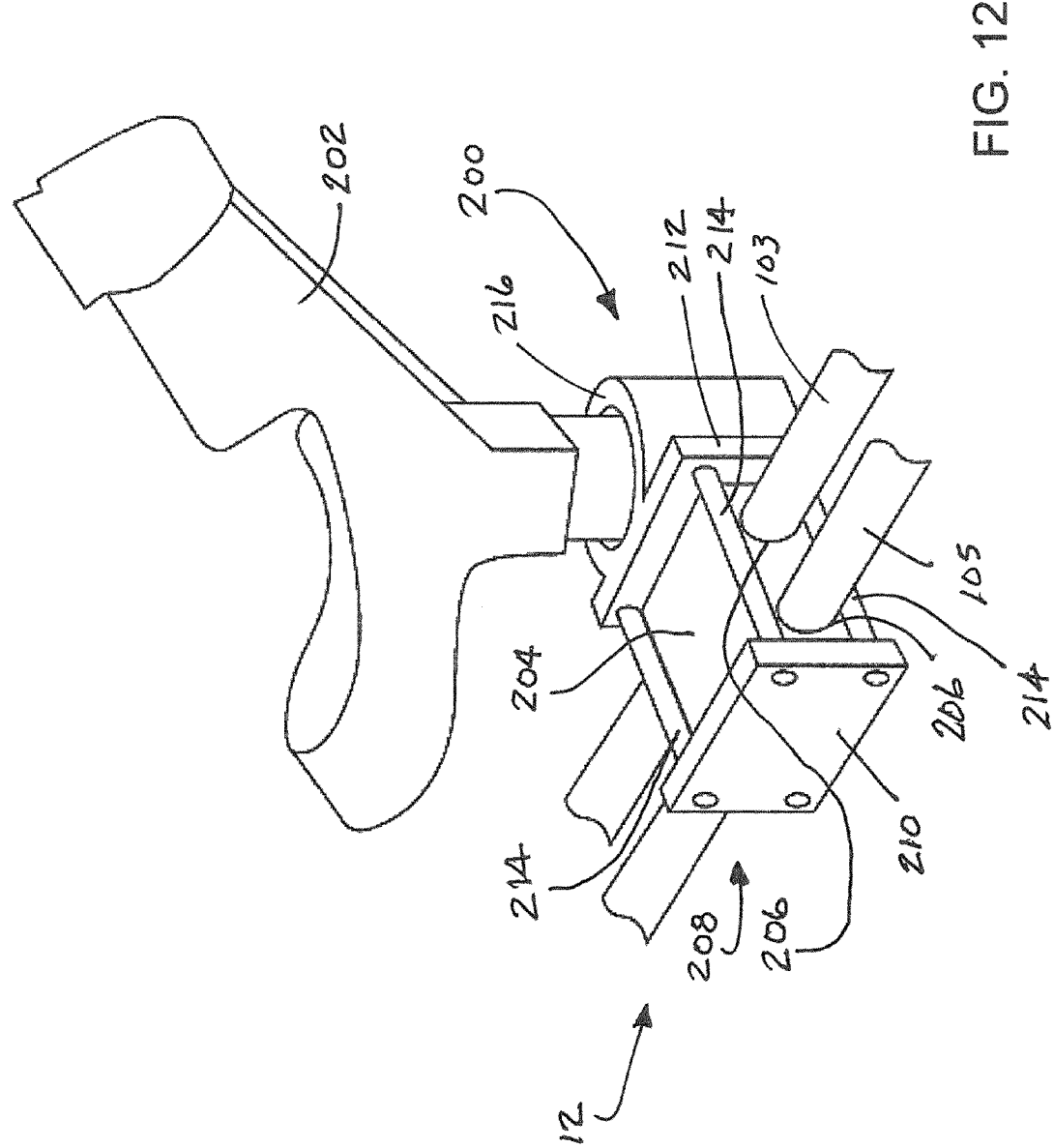
FIG. 12 illustrates in detail the mounting of a first type of fishing rod holder to the bracket of FIG. 2A.

Reference is now made to FIG. 12 which illustrates a first embodiment of mounting assembly 200 that may be used to mount an accessory, such as a fishing rod holder 202, to the bracket 12. The mounting assembly 200 includes a rectangular mounting block 204 having two spaced openings 206 that receives the legs 103, 105 of the bracket 12. The mounting block 204 supports the legs 103, 105 and prevents them from being compressed together or pulled apart thereby enhancing the rigidity of the bracket 12. Thus, the block 204 resists any deflection of the rods 103, 105 preventing its translation to the body of the personal watercraft.

A frame 208 is secured to the mounting block 204. The frame 208 includes two end plates 210, 212 and four connecting rods 214. The connecting rods 214 may include threaded ends that are tightened into the end plate 210. In the illustrated embodiment the end plate 212 includes a mounting ring 216 that is capable of receiving and holding the fishing rod holder 202 which includes structure known in the art to receive and hold the handle of a fishing rod (not shown). In an alternative embodiment, the end plate 210 may also include a mounting ring 216 to hold a second fishing rod holder 202.

Figure 13:
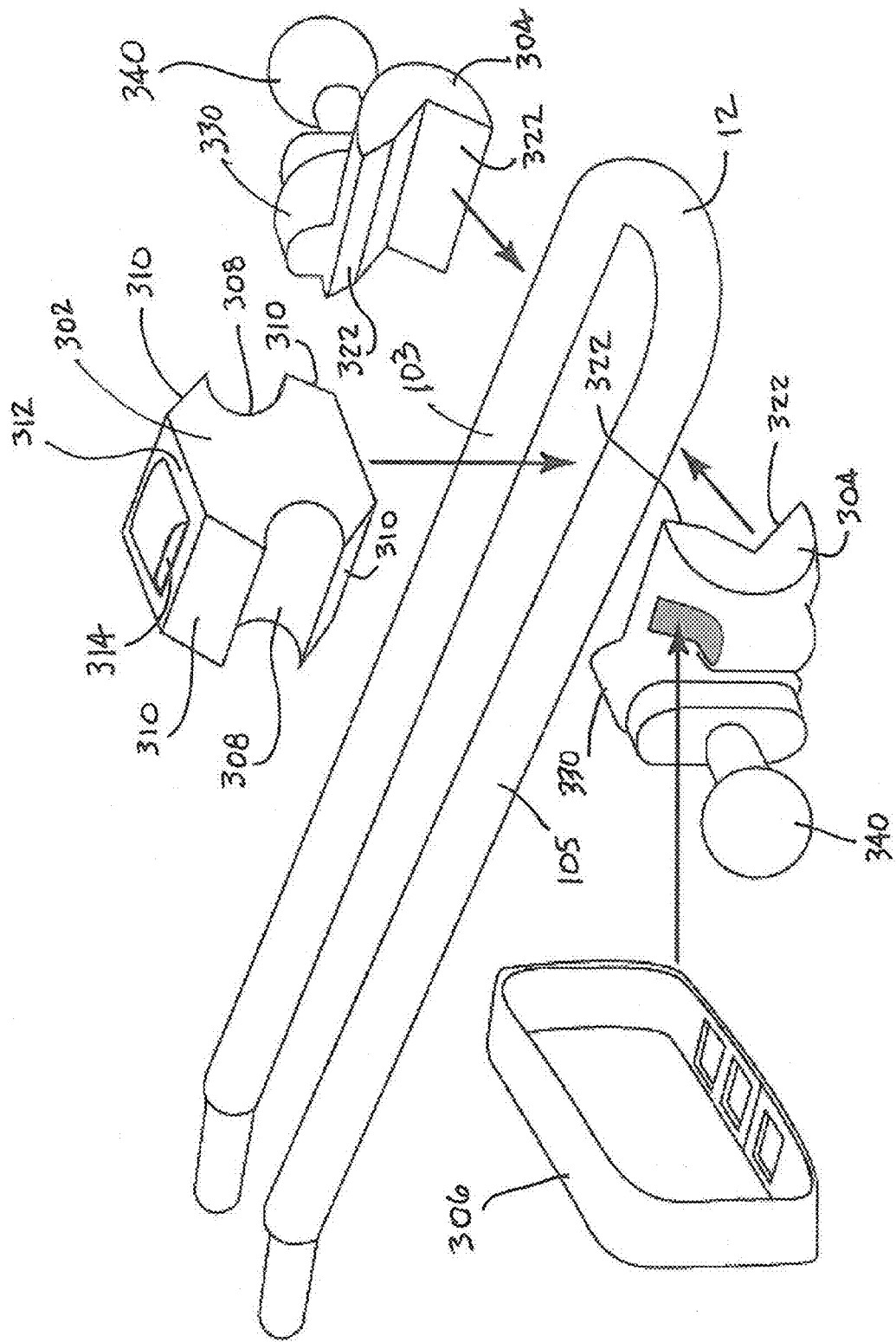
FIG. 13 is an exploded perspective view illustrating an accessory mounting assembly used on the brackets illustrated in FIGS. 1A-4B.
Figure 14:
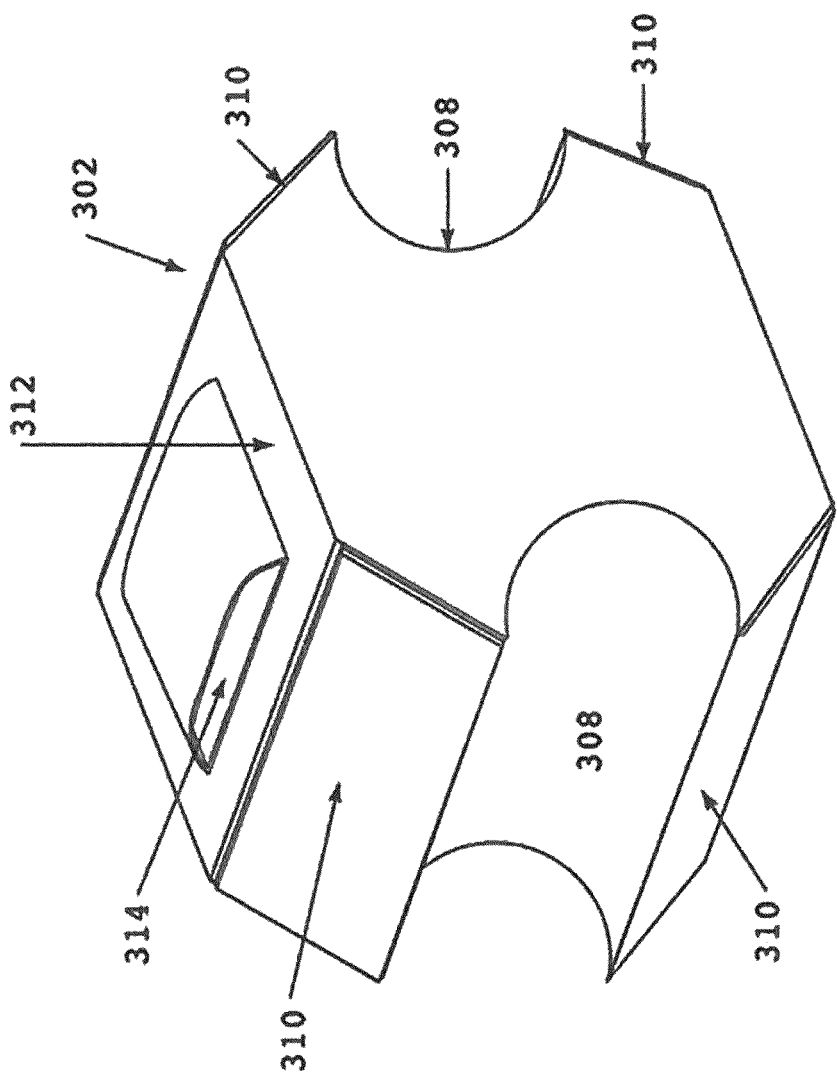
FIG. 14 is a detailed perspective view of the main mounting block of the mounting assembly illustrated in FIG. 13.

FIG. 13 illustrates a second embodiment of accessory mounting assembly 300. The mounting assembly 300 may be broadly described as including a main mounting block 302, two end caps 304 and a ratchet strap 306. The main mounting block 302 includes two side walls. Each sidewall has a groove 308 positioned between two angled abutment surfaces 310 (see also FIG. 14). The abutment surfaces 310 include beveled edges that mate with cooperating bevel-edged structure of the fishing rod holder so as to provide for position location, ease of assembly and superior stability of connection. In addition, the top wall 312 of the block 302 includes a slot 314 that receives and holds the ratchet strap 306.

Figure 15:
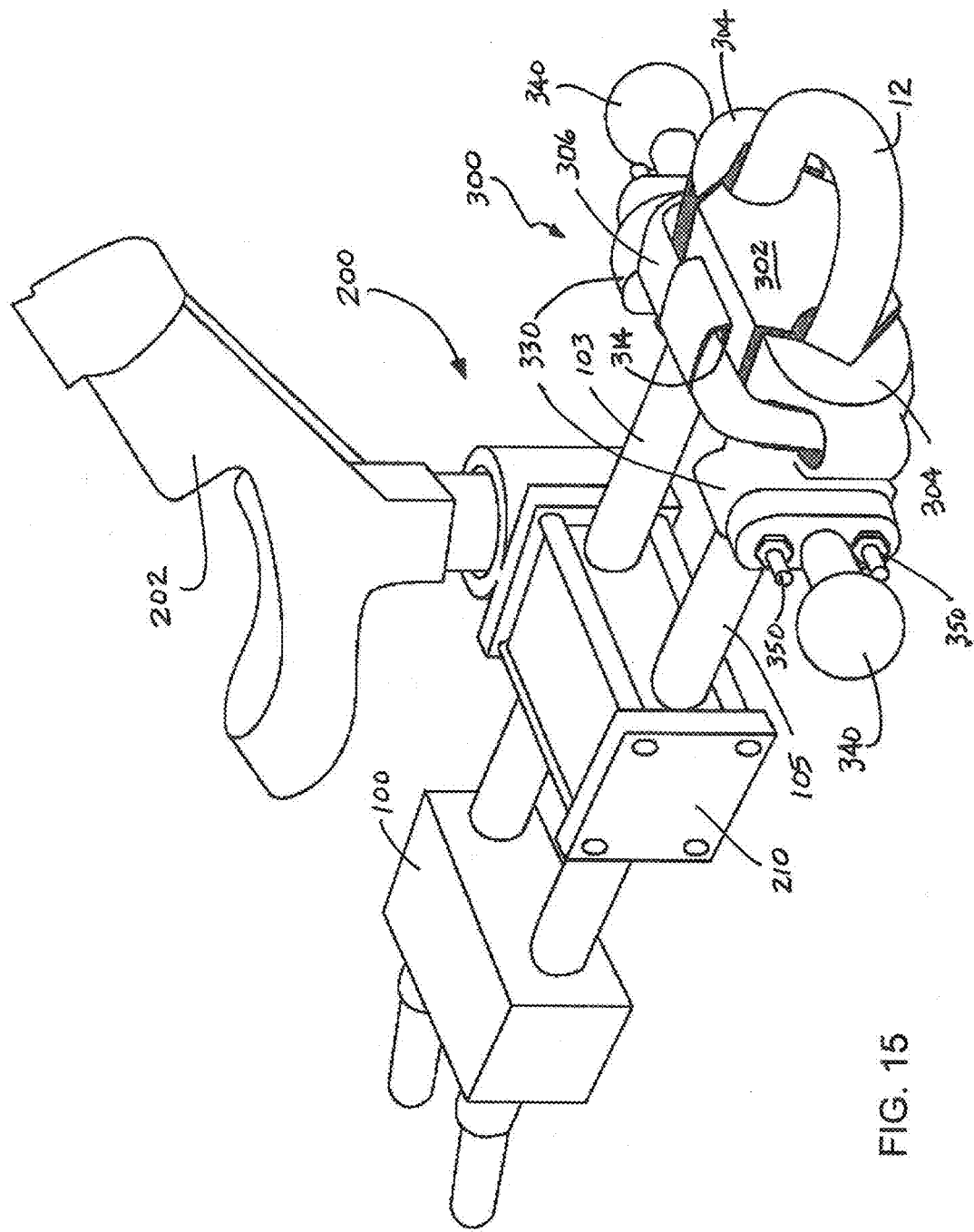
FIG. 15 is a detailed perspective view illustrating both types of mounting assemblies connected to a single bracket.

As best illustrated in FIG. 15, when the mounting assembly 300 is secured to the bracket 12, the legs 103, 105 of the bracket are received in the two opposing sidewall grooves 308. Further, the ratchet strap 306 is extended through the slot 314 on the block 302 and slots 320 in each end cap 304 before being tightened down to secure the assembly 300 together with the legs 103, 105 of the bracket 12 captured in the opposed grooves 308. Cooperating abutment walls 322 on each end cap 304 engage and abut with the abutment surfaces 310 of the mounting block 302 to provide a secure connection that resists disengagement and rotation. As should be appreciated the block 302 is dimensioned so that it supports the legs 103, 105 in the grooves 308 and prevents their compression or separation thereby adding rigidity to the bracket 12 and protecting the bracket mounting point on the personal watercraft from possible deflection transmitted through the bracket 12.

As should be appreciated from viewing FIG. 15, either or both end caps 304 may include a lug 330 adapted to receive and hold an accessory mounting element such as the mounting balls 340. In the illustrated embodiment, the mounting balls 340 are secured to the lug 330 by cooperating nut and bolt fasteners 350. It should be appreciated that other types of accessory mounting elements and other types of fasteners may be utilized and that the illustration shows just one possible example embodiment.

As illustrated in FIG. 15, the bracket 12 carries a clip-type spacer 100, a first embodiment of accessory holder 200 and a second embodiment of accessory holder 300. Thus, it should be appreciated that the spacer 100 and accessory holders 200, 300 may be used together if desired. Alternatively, the accessory holders and spacer 100 may be used individually if desired. Substantially any combination or permutation of these structures 100, 200, 300 may be used on the bracket 12 depending on the particular application and needs of the user of the personal watercraft.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

DESCRIPTION OF OPERATION

In operation, the bracket as illustrated in the examples of FIGS. 1A-11 is used by mounting it to a PWC, primarily by securing the free ends of the longitudinal legs or stem portion of the bracket in existing mounting holes formed in the rear seat or rear deck of the PWC, and secondarily if desired by securing tensioning straps to rear portions of the bracket frame and to hooks or cleats in the lower rear of the PWC below the bracket. Sporting, safety, and recreational equipment can then be secured directly to portions of the bracket frame about the perimeter of the bracket, either inside or outside the frame, for example with rope, clips, cable, or ties; or, the equipment may simply be placed within the frame-enclosed interior storage area of the bracket, including both the narrower longitudinal "stem" and the wider transverse "head" regions, the equipment resting on the deck and constrained by the frame from shifting longitudinally or laterally about the deck.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. For example, the block 204 may be positioned on the rods 103,105 against the bottom of the seat 2. In this position the block 204 works against the straps 201 with the straps limiting any downward deflection and the block limiting any upward deflection of the bracket 12. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. An apparatus for mounting an accessory to a personal watercraft, comprising:
   an accessory mounting assembly including;
   a bracket including a first leg;
   a mounting block including two sidewalls, wherein said mounting block is configured to be supported by said first leg;
   a first end cap configured to be secured to a first sidewall of said two sidewalls;
   a second end cap configured to be secured to a second sidewall of said two sidewalls; and
   a connector configured to secure said mounting block and said first and second end caps together.

2. The apparatus of claim 1 wherein said connector is a ratchet strap.

3. The apparatus of claim 1 further including a first groove in said first sidewall and a second groove in said second sidewall.

4. The apparatus of claim 3, wherein said first and second grooves are opposed.

5. The apparatus of claim 3, wherein said first groove is provided between a first set of angled abutment surfaces and said second groove is provided between a second set of angled abutment surfaces.

6. The apparatus of claim 5, wherein said first end cap includes a first set of angled abutment walls configured to cooperate and engage said first set of abutment surfaces.

7. The apparatus of claim 6, wherein said second end cap includes a second set of angled abutment walls configured to cooperate and engage said second set of abutment surfaces.

8. The apparatus of claim 1, wherein said mounting block further includes a top wall, wherein the top wall includes a first slot configured to receive a ratchet strap.

9. The apparatus of claim 8, wherein said first end cap includes a second slot and said second end cap includes a third slot, wherein the second slot and third slot are configured to receive the ratchet strap.

10. The apparatus of claim 1, wherein said first end cap includes a first lug.

11. The apparatus of claim 10, wherein a first accessory mounting element is configured to be secured to said first lug.

12. The apparatus of claim 11, wherein said second end cap includes a second lug and a second accessory mounting element is configured to be secured to said second lug.

13. The apparatus of claim 3, wherein said first groove is configured to capture said first leg between said mounting block and said first end cap and further including a second leg and wherein said second groove is configured to capture said second leg between said mounting block and said second end cap.

14. An apparatus for mounting accessories to a personal watercraft, comprising:
   a bracket having a first leg;
   a mounting block configured to be supported by said first leg;
   a frame configured to be secured to said mounting block, said frame including a first end plate, a second end plate and a plurality of connecting rods configured to secure said end plates together and to said mounting block; and
   a first accessory mounting element configured to be carried on said first end plate.

15. The apparatus of claim 14 further including a second accessory mounting element configured to be carried on said second end plate.

16. The apparatus of claim 14, further including a first opening extending through said mounting block.

17. The apparatus of claim 16, wherein said first leg extends through said first opening in said mounting block.

18. The apparatus of claim 17, wherein said first accessory mounting element comprises a ring and a fishing rod holder is configured to be secured to said ring.

* * * * *